United States Patent
Trivedi et al.

(10) Patent No.: US 9,617,889 B2
(45) Date of Patent: Apr. 11, 2017

(54) SYSTEMS AND TECHNIQUES FOR NOZZLE COOLING OF DIESEL EXHAUST FLUID INJECTION SYSTEMS

(71) Applicant: Cummins Emission Solutions Inc., Columbus, IN (US)

(72) Inventors: Aalok Trivedi, Columbus, IN (US); Andrew Myer, Greenwood, IN (US); Stephanie L. Apewokin, St. Anthony, MN (US); Samuel Johnson, Bloomington, IN (US); Srivardhan Chandrapati, Battle Creek, MI (US); George L. Muntean, Columbus, IN (US); Joshua D. Henry, Indianapolis, IN (US); John Anthis, Columbus, IN (US); Omkar Tendolkar, Columbus, IN (US)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 0 days.

(21) Appl. No.: 14/957,019

(22) Filed: Dec. 2, 2015

(65) Prior Publication Data

US 2016/0084131 A1  Mar. 24, 2016

Related U.S. Application Data

(62) Division of application No. 13/911,640, filed on Jun. 6, 2013, now Pat. No. 9,234,445.

(51) Int. Cl.
*F01N 3/00* (2006.01)
*F01N 3/02* (2006.01)
*F01N 3/10* (2006.01)
*F01N 3/20* (2006.01)
*F01N 9/00* (2006.01)

(52) U.S. Cl.
CPC ......... *F01N 3/2046* (2013.01); *F01N 3/2066* (2013.01); *F01N 9/00* (2013.01); *F01N 2610/02* (2013.01); *F01N 2610/11* (2013.01); *F01N 2610/1453* (2013.01); *F01N 2900/1811* (2013.01); *Y02T 10/24* (2013.01); *Y02T 10/47* (2013.01)

(58) Field of Classification Search
CPC ...... F01N 3/2066; F01N 9/00; F01N 2610/02; F01N 2610/11; F01N 2610/1453; F01N 2900/1811
USPC .................................................. 60/295, 324
See application file for complete search history.

(56) References Cited

U.S. PATENT DOCUMENTS

| | | |
|---|---|---|
| 4,470,278 A | 9/1984 | Hale et al. |
| 5,284,372 A | 2/1994 | Lin |
| 5,301,526 A | 4/1994 | Fann et al. |
| 5,372,025 A | 12/1994 | Lin |
| 5,657,653 A | 8/1997 | Hensley et al. |
| 5,784,909 A | 7/1998 | Huang |
| 5,941,108 A | 8/1999 | Shen |

(Continued)

*Primary Examiner* — Audrey K Bradley
*Assistant Examiner* — Dapinder Singh
(74) *Attorney, Agent, or Firm* — Foley & Lardner LLP (57) ABSTRACT

A system is provided for delivery of diesel exhaust fluid or other reductant to an injector for release into an engine exhaust aftertreatment system. The injector includes a nozzle assembly that thermally shields the diesel exhaust fluid from the exhaust gas temperatures. A diesel exhaust fluid delivery procedure is also disclosed for nozzle cooling prior to operation of the injector for emissions reduction.

10 Claims, 6 Drawing Sheets

(56) References Cited

U.S. PATENT DOCUMENTS

| | | | |
|---|---|---|---|
| 6,141,998 | A | 11/2000 | Seo |
| 6,158,676 | A * | 12/2000 | Hughes .................. A61M 11/06 239/337 |
| 6,216,500 | B1 | 4/2001 | Kang |
| 6,425,273 | B1 | 7/2002 | Kim et al. |
| 6,615,630 | B2 | 9/2003 | Wu et al. |
| 6,807,833 | B1 | 10/2004 | Huang et al. |
| 6,993,945 | B1 | 2/2006 | Chen |
| 7,100,407 | B2 | 9/2006 | Chen |
| 7,559,219 | B2 | 7/2009 | Chen |
| 7,934,754 | B2 | 5/2011 | Mathachan |
| 2004/0211846 | A1 | 10/2004 | Chenanda et al. |
| 2005/0224601 | A1 | 10/2005 | Baker et al. |
| 2010/0024746 | A1 | 2/2010 | Merchant et al. |
| 2010/0320285 | A1 | 12/2010 | Haeberer et al. |
| 2011/0192140 | A1 | 8/2011 | Olivier et al. |
| 2013/0019584 | A1* | 1/2013 | Koizumi .................. F23R 3/28 60/39.465 |

* cited by examiner

SYSTEMS AND TECHNIQUES FOR NOZZLE COOLING OF DIESEL EXHAUST FLUID INJECTION SYSTEMS

CROSS REFERENCE TO RELATED APPLICATIONS

The present application is a divisional of U.S. patent application Ser. No. 13/911,640, filed Jun. 6, 2013, and the contents of which are incorporated herein by reference in its entirety.

BACKGROUND

Selective catalytic reduction ("SCR") exhaust aftertreatment systems are an important technology for reducing NOx emissions from internal combustion engines such as diesel engines. SCR systems generally include a source of storage for the diesel exhaust fluid (DEF), a doser that includes at least one of a pump unit for pressurizing the DEF and a metering unit for providing a controlled amount or rate of DEF, and an injector which provides urea solution to a DEF decomposition region of an exhaust flow path located upstream from an SCR catalyst. Many SCR systems also utilize pressurized gas to assist the flow of DEF to the injector. While providing important reductions in NOx emissions, SCR systems suffer from a number of shortcomings and problems.

For example, the nozzle for injecting DEF into the exhaust system is typically mounted to or within the exhaust system. At high exhaust temperatures, the nozzle is also heated. The heated nozzle can vaporize the water in the DEF at the start of the injection cycle until the nozzle is sufficiently cooled by the DEF flow. This vaporization results in a large pressure wave that expands upstream from the nozzle through the doser system, increasing the potential for damage and repairs. Thus, there is a need for advancements mitigating these and other shortcomings associated with injection systems for delivery of DEF through a nozzle connected to an exhaust system.

SUMMARY

Certain exemplary embodiments include systems and techniques for thermal management of a nozzle that delivers diesel exhaust fluid for operation of an SCR catalyst. In one aspect, the system includes a nozzle assembly with thermal shielding to reduce heat transfer from the exhaust system to the nozzle. In another aspect, the nozzle assembly includes a heat dissipation device extending from the exhaust to reject heat transferred from the exhaust to the nozzle assembly to the surrounding atmosphere. In another aspect, a method includes pulsed DEF delivery through the nozzle to provide nozzle cooling prior to initiation of a normal DEF injection event for treatment of emissions. Combinations of the thermally shielded nozzle, heat dissipation devices, and pulsed DEF delivery are also contemplated.

Further aspects, embodiments, forms, features, benefits, objects, and advantages shall become apparent from the detailed description and figures provided herewith.

DETAILED DESCRIPTION OF EXEMPLARY EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1:
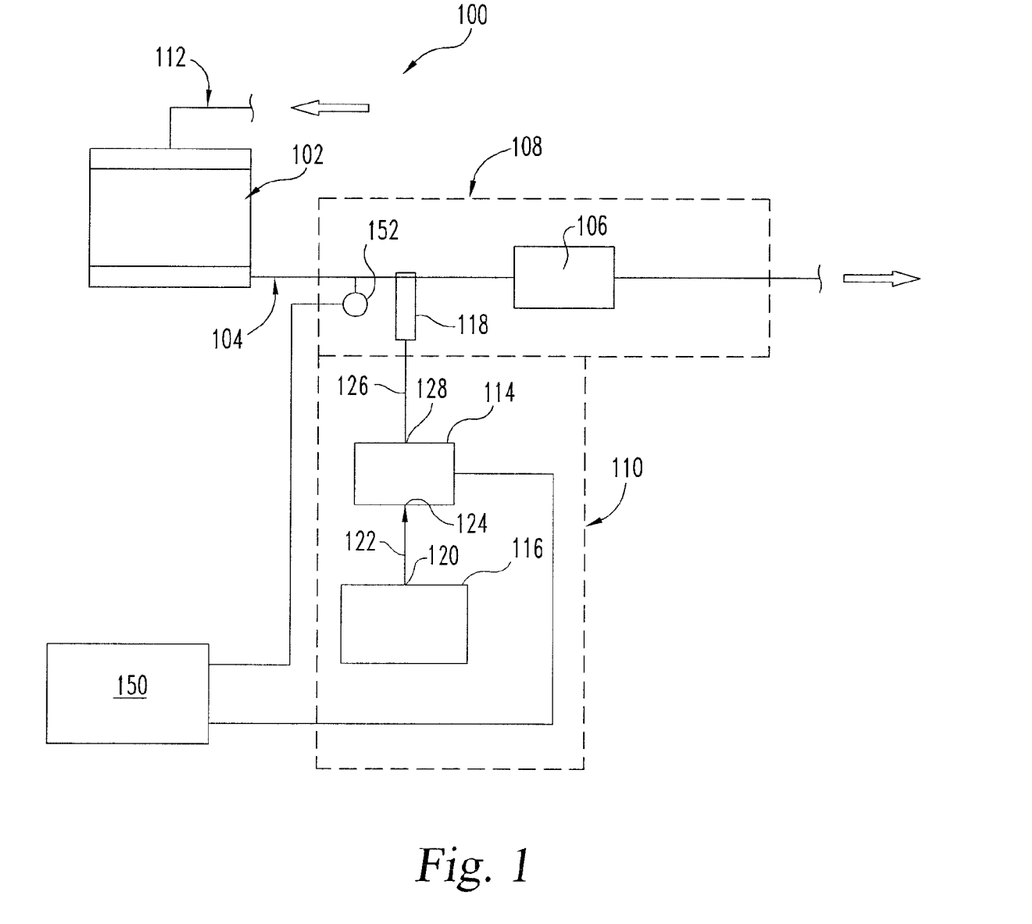
FIG. 1 is a schematic view of an exemplary DEF delivery system.

With reference to FIG. 1 there is illustrated an exemplary system 100 that includes a delivery system 110 for delivery of any suitable reductant, also referred to as DEF, to an exhaust system 104 connected to an engine 102. System 100 may be provided on a vehicle powered by engine 102, or on an engine 102 utilized in other applications such power generation or pumping systems. Engine 102 can be a diesel engine or any suitable internal combustion engine for which exhaust treatment with a reductant is provided. Engine 102 includes an intake system 112 through which charge air enters and an exhaust system 104 through which exhaust gas resulting from combustion exits, it being understood that not all details of these systems that are typically present are shown. Engine 102 includes a number of cylinders (not shown) forming combustion chambers into which fuel is injected by fuel injectors (not shown) to combust with the charge air that has entered through intake system 112. The energy released by combustion powers the engine 102 via pistons connected to a crankshaft (not shown). When used to propel a vehicle, engine 102 is coupled through a drivetrain (not shown) to drive wheels that propel the vehicle. Intake valves (not shown) control the admission of charge air into the cylinders, and exhaust valves (not shown) control the outflow of exhaust gas through exhaust system 104 and ultimately to atmosphere. Before entering the atmosphere, the exhaust gas is treated by one or more aftertreatment devices in an aftertreatment system 108.

In one example, the exhaust system 104 includes an aftertreatment system 108 having one or more SCR catalysts 106 and one or more locations for receiving DEF from DEF delivery system 110. The aftertreatment system 108 may include one or more other aftertreatment components not shown, such as one or more oxidation catalysts, one or more particulate filters, an ammonia oxidation catalyst, and various temperature, pressure and exhaust gas constituent sensors. Exhaust system 104 may also include various components not shown, such an EGR system, a turbocharger system, coolers, and other components connecting exhaust system 104 to intake system 112. A DEF injector 118 is mounted on a portion of exhaust system 104 upstream of SCR catalyst 106 with its outlet, or nozzle, arranged to spray aqueous DEF into the exhaust system where it mixes with engine exhaust gas produced by engine 102. SCR catalyst 106 promotes a chemical reaction between the reductant and NOx in the exhaust gas that converts substantial amounts of NOx to reduce NOx emissions before the exhaust gas passes into the atmosphere.

The DEF delivery system 110 further includes a doser 114 that receives DEF from a storage tank 116 and provides the DEF to injector 118 for injection or delivery to a decomposition chamber or directly into the exhaust system 104. As used herein, injector includes any nozzle, static device, electronically controllable device, and/or mechanical actuator that provide an outlet for DEF delivery. One example of a suitable diesel exhaust fluid comprises a solution of 32.5% high purity urea and 67.5% deionized water. It shall be appreciated, however, that other DEF solutions and reductants may also be utilized.

Doser 114 may include various structures to facilitate receipt of DEF from storage tank 116 and the delivery of the DEF to the exhaust system 104. For example, doser 114 may include a pump and a filter screen and a check valve upstream of the pump to receive DEF from the storage tank 116. In one form the pump is a diaphragm pump, though it shall be appreciated that other types of pumps may be utilized. The pump outputs pressurized DEF at a predetermined pressure which flows through a second check valve, a pulsation dampener, and a second filter to provide pressurized reductant to a metering valve. Doser 114 may further include a bypass line around the pump having a bypass valve which is operable to open and close to permit or prevent the flow of DEF through the bypass line to a location upstream of the first filter screen where it may be returned to the storage tank 116, for example, during a purging operation. Doser 114 may further include a blending chamber that receives DEF from the metering valve at a controllable rate. The blending chamber also receives a flow of pressurized air from an air supply and discharges a combined flow of pressurized air and DEF at an outlet 128 of doser 114. The air supply may be integral to a vehicle, integral to an engine, or may be an air supply dedicated to system 100. It shall be understood that additional embodiments may utilize pressurized gases other than air, for example, combinations of one or more inert gases.

Storage tank 116 holds a supply of DEF and is vented to allow reductant to be withdrawn at a port 120. A conduit 122 extends from port 120 to an inlet port 124 of doser 114. A conduit 126 extends from outlet port 128 of doser 114 to injector 118. When doser 114 operates, it draws reductant from storage tank 116 through conduit 122, and pumps the reductant through conduit 126 to injector 118. A backflow conduit (not shown) may be provided to return excess reductant to storage tank 116.

Figure 2:
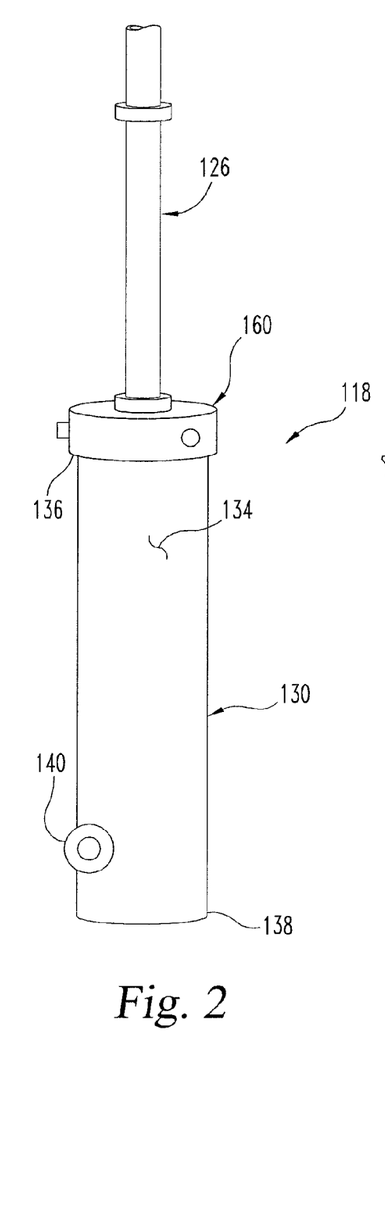
FIG. 2 is an elevation view of an injector with thermal shielding comprising a part of the DEF delivery system of FIG. 1.
Figure 3:
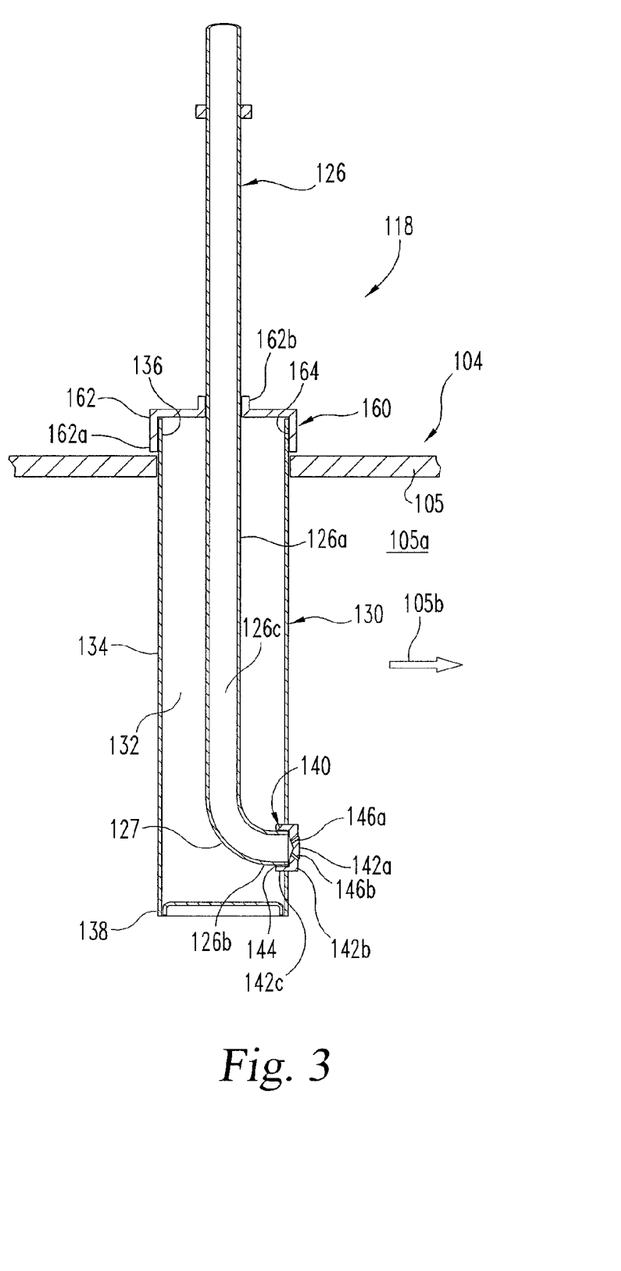
FIG. 3 is a cross-sectional view of the injector of FIG. 2 position in an exhaust conduit.

Further details of one embodiment of injector 118 are shown in FIGS. 2 and 3. Injector 118 includes an elongated jacket 130 defining an interior space 132. Jacket 130 includes a side wall 134 surrounding interior space 132 that extends from a first end 136 to an opposite second end 138. Conduit 126 includes a first portion 126a that enters jacket 130 at first end 136 and extends substantially along the center of jacket 130 to a bend 127. Bend 127 is adjacent to and spaced longitudinally from second end 138 of jacket 130. Conduit 126 includes a second portion 126b extending from bend 127 that is oriented substantially orthogonally to first portion 126a. Second portion 126b of conduit 126 extends to a nozzle 140 secured in side wall 134. Nozzle 140 is connected to and in fluid communication with flow passage 105a defined by exhaust conduit 105 of exhaust system 104.

In the illustrated embodiment, nozzle 140 includes a body 142 with an inner portion 142c defining a cylindrically shaped interior receptacle 144 opening in hollow interior 132 to receive an end of second portion 126b of conduit 126. Nozzle 140 also defines first and second flow paths 146a, 146b that are obliquely oriented to flow passage 105a and to second portion 126b of conduit 126. Flow paths 146a, 146b are in fluid communication with interior 126c of conduit 126 to provide a spray of DEF into flow passage 105a of exhaust conduit 105. It should be understood that more than two flow paths are contemplated and other arrangements of flow paths are contemplated to provide various spray patterns for the DEF into exhaust conduit 105. In the illustrated embodiment, flow paths 146a, 146b open through an outer projection portion 142a of body 142 that defines a lip 142b around inner portion 142c of body 142. Inner portion 142c extends from interior space 132 and projects outwardly from side wall 134 to engage in an outer pilot opening of exhaust conduit 105.

Injector 118 includes a cap 160 mounted to first end 136 of jacket 130. Cap 160 includes a body 162 with a flange 162a that defines an interior receptacle 164 for receiving and connecting to side wall 134 of jacket 130. The connection of cap 160 can be formed by threads, welding, interference fit, and/or other suitable connections. Body 162 also includes a boss 162b extending opposite flange 162a and outwardly from first end 136 that defines a through-hole for receiving conduit 126 therethrough. Cap 160 is connected to jacket 130 and mounted to exhaust conduit 105 at a location that positions the connection of cap 160 with conduit 160 outside of the exhaust gas stream 105c carried by exhaust conduit 105, such as shown in FIG. 3. It should be understood that jacket 130 and/or cap 160 can be mounted to conduit 105 with any suitable mounting arrangement, such as discussed further below with respect to FIGS. 4 and 5.

Hollow interior 132 of jacket 130 defines an air gap that extends completely around conduit portions 126a, 126b that serves as a thermal barrier to reduce heat transfer from exhaust system 104 to conduit 126. The thermal barrier reduces the skin temperature of conduit 126 and nozzle 140, which reduces the temperature of the internal surface of conduit 126 and nozzle 140 and the heat transfer to the DEF and air mixture in conduit 126. The only direct contact of conduit 130 with jacket 130 and cap 160 is outside of the flow of exhaust gas, allowing heat to be rejected from cap 160 to the surrounding atmosphere before transfer to conduit 126. The length of the air gap along conduit 126 and the volume of the air gap formed by hollow interior 132 prevents or reduces phase transformation of DEF in conduit 126 and nozzle 140. Phase transformation of DEF occurs under low dosing or no dosing conditions where the temperature of the DEF is raised above a threshold temperature by the presence of high exhaust gas temperatures ranging from 200 to 650 or more degrees Celsius. The phase transformation of DEF produces compounds in injector 118 that potentially block flow paths 146a, 146b of nozzle 140. The prevention of formation of these compounds eliminates the need for an external cooling circuit to cool nozzle 140 and improves operating life of injector 118.

Figures 4, 5:
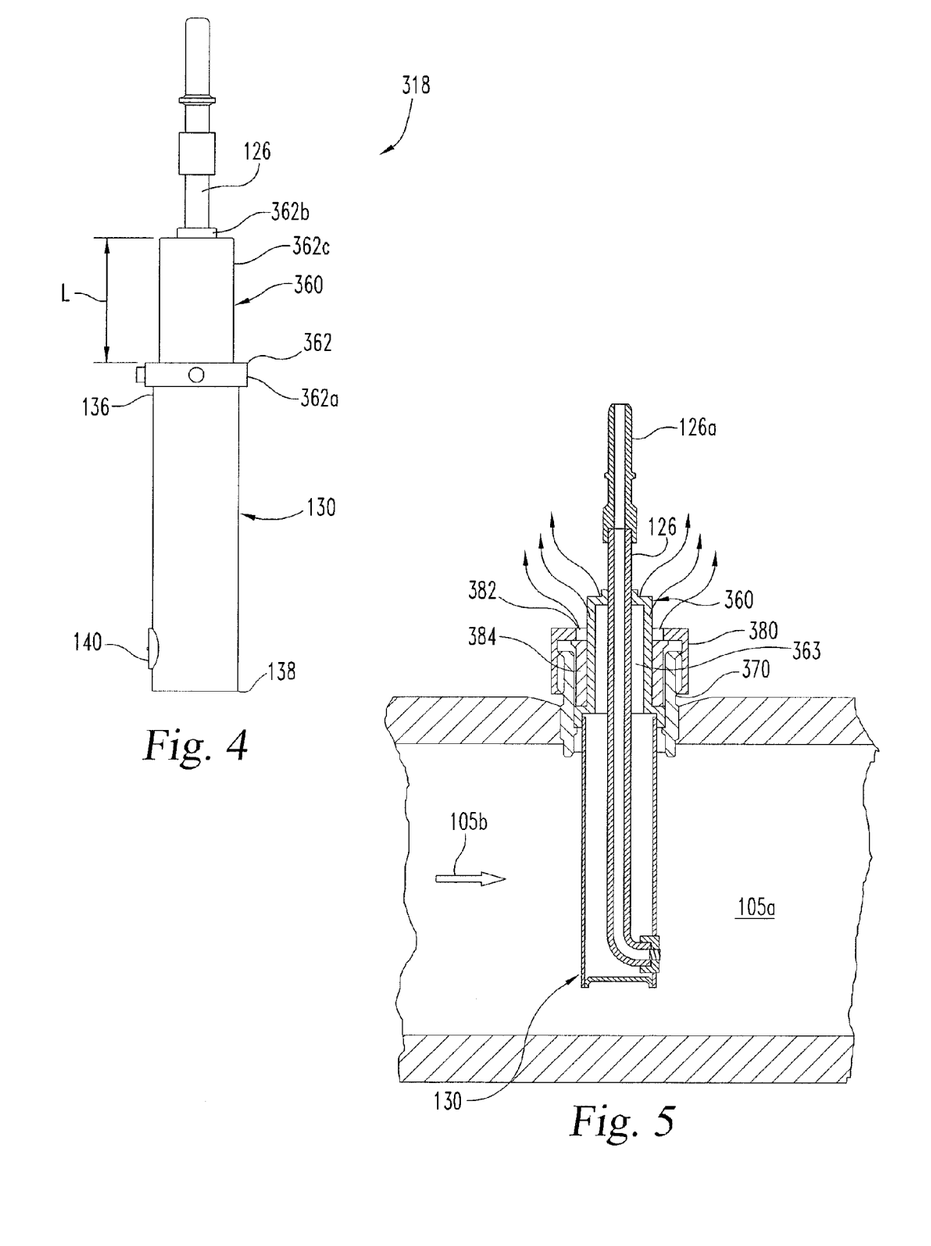
FIG. 4, is an elevation view of another embodiment injector with an extended end cap.
FIG. 5 is a partial cross-sectional view of the injector of FIG. 4 positioned in an exhaust conduit.

Further details of another embodiment of injector 318 are shown in FIGS. 4 and 5. Injector 318 includes elements that are or can be the same as those as injector 118 as discussed above, and such like elements are designated with the same reference numeral for convenience. Injector 318 also includes an end cap 360 that is connected to jacket 130 and DEF conduit 126. End cap 360 includes a flange 362a at one end thereof that is mounted to first end 136 of jacket 130. End cap 360 also includes a boss 362b at an opposite end thereof through which DEF conduit 126 extends. In one embodiment, boss 362b provides the only connection of injector 318 to DEF conduit 126, with nozzle 140 connecting DEF conduit 126 to jacket 130. Flange 362a and boss 362b are similar to flange 162a and boss 162b of end cap 160. However, in contrast to end cap 160, end cap 360 includes an extension member 362c extending between flange 362a and boss 362b.

Extension member 362c defines a length L between flange 362a and boss 362c. Length L is sized so that when injector 318 is mounted to exhaust conduit 105 as shown in FIG. 5, boss 362b is located outside of and spaced radially outwardly from conduit 105. This places the connection of DEF conduit 126 with injector 318 outside of the exhaust flow 105b of exhaust conduit 105, reducing the heat transfer from the exhaust to DEF in conduit 126. Furthermore, the air gap defined by jacket 130 is extended radially outwardly from conduit 105 by air gap 363 of extension member 362c of end cap 360, providing additional insulation around conduit 126 and a path for rejection of heat into atmosphere before transfer to DEF conduit 126 at boss 362b. Conduit 126 may include one or more fittings 126a connected thereto outside of end cap 360 for connection to DEF tubing from the doser.

As shown in FIG. 5, injector 318 is mounted to exhaust conduit 105 so that nozzle 140 is positioned in about the center of exhaust conduit 105 and oriented in the direction of exhaust flow 105b. Exhaust conduit 105 includes a mounting member 370 that is secured to exhaust conduit 105 and includes an internal passage and support structure to support end cap 360 with jacket 130 extending therefrom into passage 105a of exhaust conduit 105. A securing member 380 is secured around mounting member 370 to maintain injector 318 in engagement with mounting member 317. Heat from exhaust gas in exhaust conduit 105 passes through collar portion 384 between mounting member 370 and extension member 362a and also through openings 382 of securing member 380. In one embodiment, collar portion includes a seal to prevent exhaust gas from escaping between mounting member 370 and end cap 360.

Referring back to FIG. 1, the flow of DEF to injector 118 for injection into exhaust system 104 may be controlled and monitored by controller 150 such as an engine control module (ECM) or a doser control module (DCM). It shall be appreciated that the controller or control module may be provided in a variety of forms and configurations including one or more computing devices forming a whole or part of a processing subsystem having non-transitory memory storing computer executable instructions, processing, and communication hardware. It shall be further appreciated that controller may be a single device or a distributed device, and the functions of the controller may be performed by hardware or software. The controller 150 is in communication with any devices, sensors, and/or actuators as required to perform the functions present in a given embodiment.

Controller 150 is operatively coupled with and configured to store instructions in a memory which are readable and executable by controller 150 and communicated to doser 114 to provide DEF from storage tank 116 to injector 118. Controller 150 is also operatively coupled and may receive a signal from a temperature sensor 152 associated with exhaust system 104 at or near injector 118. Temperature sensor 152 is operable to provide a signal indicating the temperature of at least one of exhaust system 104 and injector 118. Temperature sensor 152 need not be in direct communication with exhaust system 104 and/or injector 118, and can be located at any position within reductant delivery system 110 that provides a suitable indication of exhaust temperature and/or injector temperature.

Figure 6:
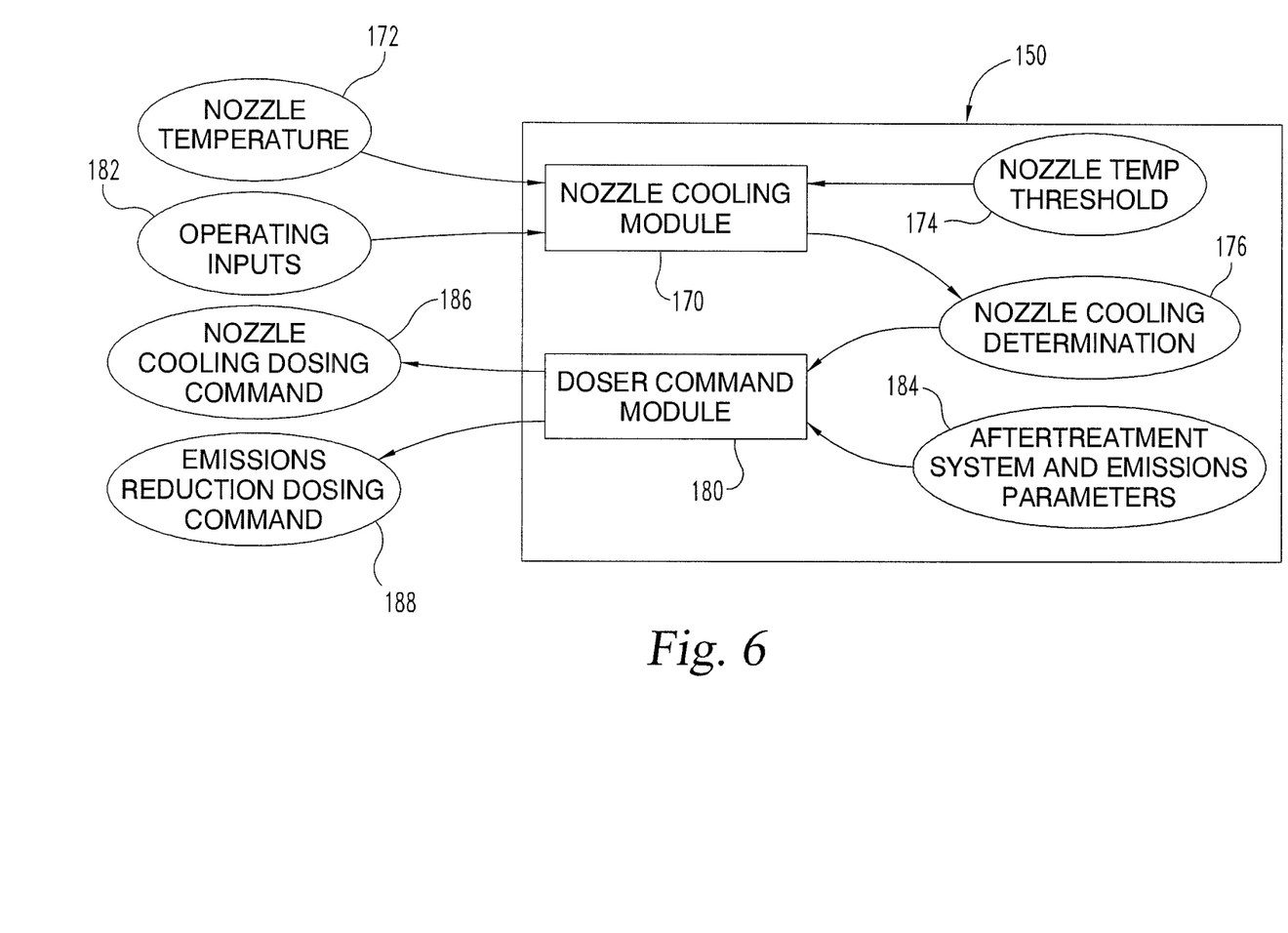
FIG. 6 is a diagrammatic view of an exemplary controller of the DEF delivery system of FIG. 1 configured to execute a nozzle cooling procedure.

One embodiment of controller 150 is shown in FIG. 6. In certain embodiments, the controller 150 includes one or more modules structured to functionally execute the operations of the controller 150. In certain embodiments, the controller 150 includes a nozzle cooling module 170 and a doser command module 180. The description herein including modules emphasizes the structural independence of the aspects of the controller 150, and illustrates one grouping of operations and responsibilities of the controller 150. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 6.

Certain operations described herein include operations to interpret one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Controller 150, as discussed further below, is configured to determine and communicate one or more nozzle cooling dosing commands 186 to produce a pulsed, finite flow of DEF through injector 118 to reduce the temperature of nozzle 140 to an acceptable level, such as below nozzle threshold temperature 174, before execution of an emissions reduction dosing command 188 through injector 118 for treatment of emissions in the exhaust gas flow. The pulsed, finite flow of DEF provides sufficient cooling of nozzle 140 to minimize the impact of DEF phase transformation during a subsequent emissions reduction dosing event. The nozzle cooling procedure can be used with injector 118 disclosed in FIGS. 2-3, or with any other suitable DEF injector.

Nozzle threshold temperature 174 is, in one embodiment, a predetermined maximum temperature of the nozzle 140 above which phase transformation of DEF occurs that produces compounds that cause or increase the likelihood of nozzle blockage, preventing the delivery of the appropriate amount of DEF to exhaust system 104 for aftertreatment emissions reduction. The delivery of air through nozzle 140 provides a minimal cooling effect for nozzle 140 due to the forced convection by the air. Supplying DEF through nozzle 140 does provide a cooling effect that reduces the temperature of nozzle 140. However, when DEF is provided in response to a command to doser 114 that supplies DEF in a quantity and duration for effective operation of aftertreatment system 108 to treat exhaust emissions, the phase transformation of the leading DEF volume upon contact with a hot nozzle 140 creates an expanding wave front that pushes the DEF and air mixture upstream through conduit 126 to doser 114.

Nozzle cooling module 170 is configured to receive a nozzle temperature input 172 and compare the same with nozzle temperature threshold 174. As a result of the comparison, nozzle cooling module outputs a nozzle cooling determination 176. If nozzle cooling is not required, doser command module 186 is configured to receive operating inputs 182 from operation of engine 102, exhaust system 104 and aftertreatment system 108 and to determine an emissions reduction dosing command 188 in response thereto that satisfies aftertreatment system and emissions parameters 184.

If nozzle cooling determination 176 determines that cooling of nozzle 140 is required, then dosing command module 180 is configured to determine a nozzle cooling dosing command 186 that is executed prior to emissions reduction dosing command 188. Nozzle cooling dosing command 186 provides one or more pulsed doses of a predetermined amount of DEF through nozzle 140 to cool nozzle 140 while minimizing the pressure wave formation in conduit 126. Once nozzle 140 has obtained a nozzle temperature 172 that is less than nozzle temperature threshold 174, dosing command module resumes 180 operation by determining an emissions reduction dosing command 188 from operating inputs 182 that satisfies aftertreatment system and emissions reduction parameters 184.

Figure 7:
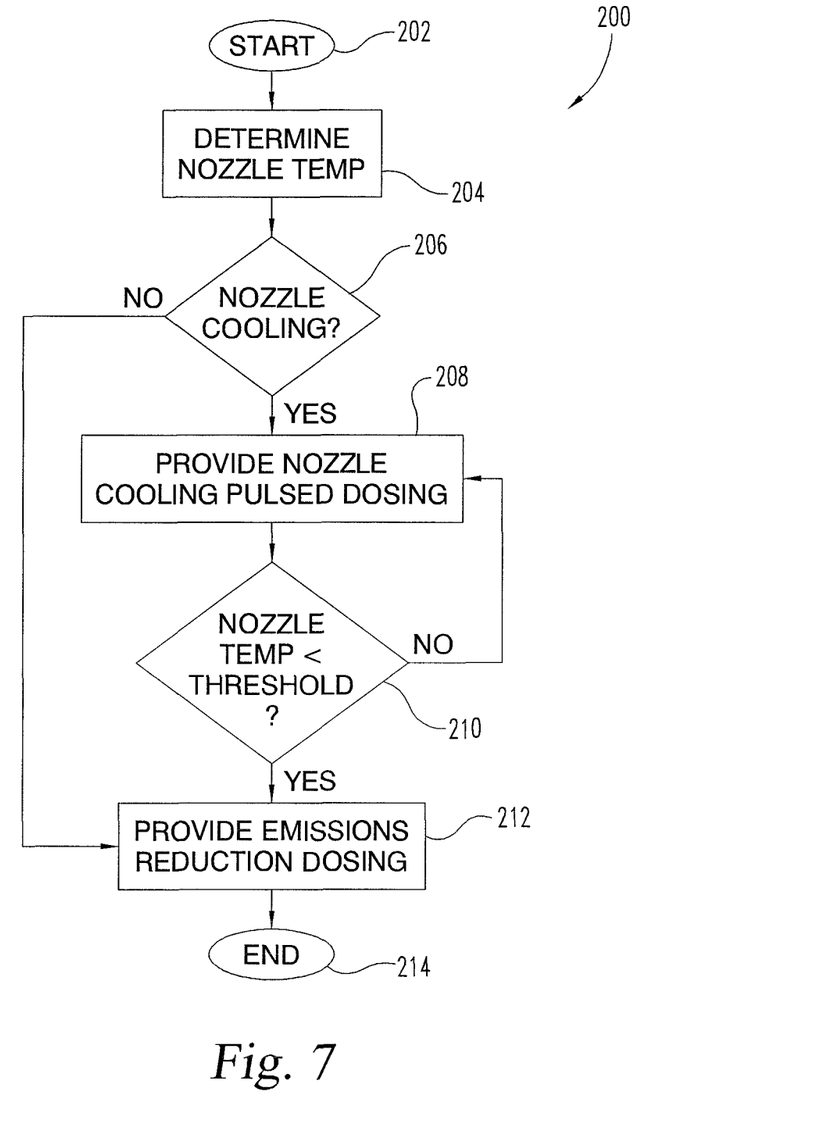
FIG. 7 is a flow diagram of an exemplary DEF nozzle cooling procedure.

With reference to FIG. 7 there is illustrated a flow diagram of an exemplary nozzle cooling procedure 200 for DEF delivery system 110 that is put in operation by programming into controller 150 for use in, for example, system 100. Procedure 200 begins at operation 202 in which a control routine for cooling of nozzle 140 of DEF delivery system 110 is started. Operation 202 can begin by interpreting a key-on event and/or by interpretation of an exhaust temperature input that is above a predetermined threshold temperature. Operation 202 may alternatively or additionally include interpreting a communication or other parameter indicating that operations of the DEF delivery system 110 is going to resume after a shutdown, or after a period of inactivity of a specified length that may not include a complete shutdown. If an engine system key-on event or other initiation condition is interpreted to be true, procedure 200 proceeds to operation 204. If an engine system key-on event is interpreted to be false, operation 202 repeats.

Operation 204 determines or interprets the nozzle temperature input 172. At conditional 206, procedure 200 determines if nozzle cooling is needed based on a comparison of the nozzle temperature input 172 and nozzle temperature threshold 174. For example, if nozzle temperature input 172 is more than a nozzle temperature threshold 174, nozzle cooling can be demanded and a nozzle cooling cycle of operation of doser 114 is initiated at operation 208. Operation 208 provides a finite amount of DEF from doser 114 in one or more pulses to satisfy nozzle cooling dosing command 186 and uses the DEF as a heat sink to absorb heat energy from nozzle 140 until the temperature of nozzle 104 is less than the nozzle temperature threshold 174, as determined at conditional 210. Nozzle cooling dosing command 186 can include one, or if more than one, multiple sequential dosing events over a predetermined length of time that limits the DEF volume through nozzle 140 to a finite amount that results in vaporization or other phase transformation of substantially all of the DEF, thus limiting the system pressure increase due to phase transformation of the DEF induced by the hot nozzle 140. While vaporization of the DEF pulses still occurs, the severity of the pressure increase and the propagation of the pressure wave upstream through conduit 126 to doser 114 is reduced while cooling the nozzle 140 with each pulsing event. Continued reduction of nozzle temperature can be accomplished by multiple doses of DEF through nozzle 140.

Once conditional 210 is affirmative, or if conditional 206 was determined to be negative, procedure 200 continues at operation 212 to provide an emissions reduction cycle of operation of doser 114. The emissions reduction cycle of operation provides DEF to exhaust system 104 in an amount that satisfies emissions reduction dosing command 188. Emissions reduction command provides DEF dosing in an amount demanded for operation of aftertreatment system 108 for continued emissions reduction and other operational requirements of aftertreatment system 108. Procedure 200 can terminate at end 214 once the emissions reduction dosing command 188 is satisfied or upon a key-off event.

Figure 8A:
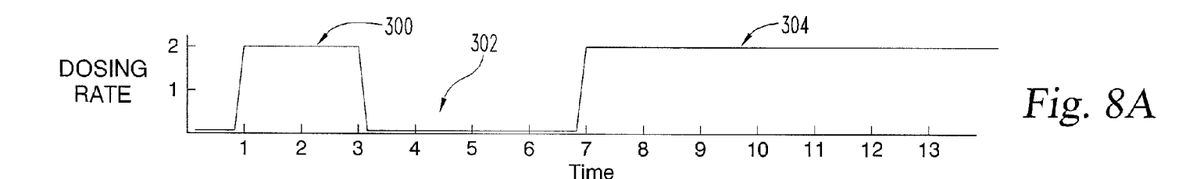
FIGS. 8A-8D are diagrams showing exemplary operations of the DEF nozzle cooling procedure over a time period.

FIGS. 8A-8D illustrate graphical examples of doser 114 operation according to procedure 200. The operation of doser 114 is depicted over a time period in seconds along the horizontal axis and a dosing rate that is in milliliters per second along the vertical axis of each of FIG. 8A-8D. The examples are provided for illustration purposes only, and are not intended to be limiting. In FIG. 8A, procedure 200 includes operation of doser 114 in a nozzle cooling cycle 300 that provides a single dose of, for example, 2 ml/s for a duration of 2 seconds. It should be understood that a range of dosing rates and durations are contemplated. After a delay period 302 of about, for example, 4 seconds, doser 114 operates in an emissions reduction cycle 304 to provide a dosing rate over a time period that satisfies emissions reduction dosing command 188. It should be understood, however, that a range of delay periods are contemplated. During delay period 302, DEF dosing from storage tank 116 is stopped. However, air may still be provided from doser 114 through nozzle 140 to continue to push residual DEF in conduit 126 to nozzle 140 for additional cooling benefit.

Figure 8B:
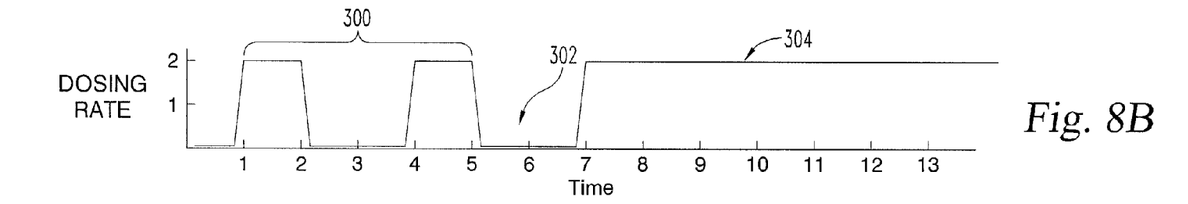

In FIG. 8B doser 114 operates in a nozzle cooling cycle 300 that includes two pulses of 2 ml/s for a duration of about 1 second each and with about 2 seconds between pulses. After a delay period 302 of about 2 seconds, doser 114 operates in an emissions reduction cycle 304 to provide a dosing rate over a time period that satisfies emissions reduction dosing command 188.

Figure 8C:
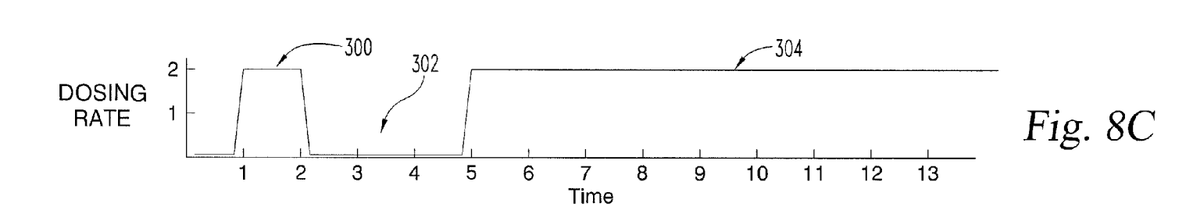
Figure 8D:
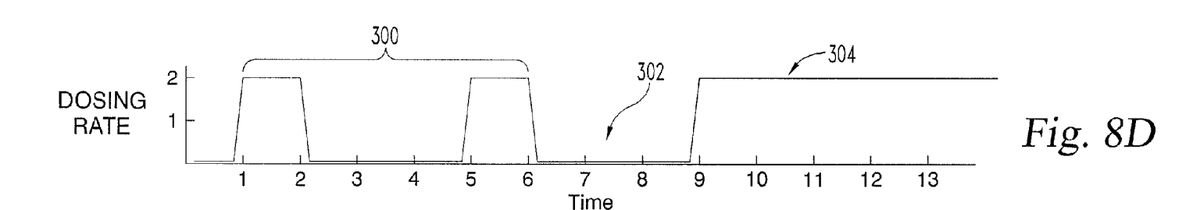

In FIG. 8C, doser 114 operates in a nozzle cooling cycle 300 that provides a single dose of 2 ml/s for a duration of about 1 second. After a delay period 302 of about 3 seconds, doser 114 operates in emissions reduction cycle 304. In FIG. 8D doser 114 operates in a nozzle cooling cycle 300 that includes two pulses of 2 ml/s for a duration of about 1 second each with about 3 seconds between pulses. After a delay period 302 of about 3 seconds, doser 114 operates in an emissions reduction cycle 304 to provide a dosing rate over a time period that satisfies emissions reduction dosing command 188. Other embodiments contemplate more than two pulses and other durations and rates for the pulses, and other duration between pulses and/or for delay period 302. Again, as discussed above, it should be understood that a range of dosing periods, dosing rates, and dosing pulses, and delay periods are contemplated.

Certain exemplary embodiments will now be further described. Certain exemplary embodiments comprise systems for providing cooling of or reducing the heating of a nozzle of a diesel exhaust fluid delivery system that is connected to an exhaust aftertreatment system. The system includes an internal combustion engine having an exhaust system for receiving an exhaust gas produced from operation of the internal combustion engine. The diesel exhaust fluid delivery system includes a storage tank for storing diesel exhaust fluid for treatment of the exhaust gas produced by operation of the internal combustion engine. The delivery system further includes a doser operable to pump the diesel exhaust fluid from the storage tank through a conduit extending from the doser to an injector in fluid communication with the exhaust system. The injector includes a nozzle connected to and in fluid communication with the conduit and the exhaust system, and an elongated jacket including a side wall defining a hollow interior extending between a first end and an opposite second end of the jacket. At least a portion of the conduit extends through the first end of the jacket to the nozzle mounted to the side wall of the jacket. The hollow interior forms an air insulation gap around the nozzle and the conduit.

In one embodiment, the conduit includes a first portion extending through the first end of the jacket, a second portion extending from the nozzle into the hollow interior, and a bend extending between and connecting the first portion and the second portion to one another in a substantially orthogonal relationship. In another embodiment, the first end of the jacket includes an end cap having a flange portion connected to the side wall and a boss portion extending opposite from the flange portion that defines a through-hole for receiving the conduit therethrough. In yet another embodiment, the nozzle includes a body with an inner portion extending into the jacket that defines a cylindrically shaped interior receptacle configured to receive an end of the conduit therein and at least two flow paths through the body that are in fluid communication with an interior of the conduit. In a refinement of this embodiment, the body of the nozzle includes an outer portion that extends from and defines a lip around the inner portion, and the inner portion extends through and projects outwardly from the side wall of the jacket.

In another embodiment, the injector includes an end cap at the first end of the jacket. The end cap includes an extension member extending from the jacket that defines an extension of the air gap, and the only direct connection of the conduit with the injector is at an end of the extension member that is opposite the first end of the jacket. In one refinement, the end cap includes a flange portion connected to the side wall of the jacket and the extension member extends from flange portion to the end of the extension member. The end cap further includes a boss portion extending outwardly from the end of the extension member that defines a through-hole for receiving the conduit therethrough. In another refinement, the injector is mounted to an exhaust conduit of the exhaust system so that the extension member extends radially outwardly from the exhaust conduit to the end of the extension member.

The injector can be mounted to the exhaust conduit with a mounting member connected to the exhaust conduit that supports the end cap on the exhaust conduit with the jacket projecting from the end cap into the exhaust conduit. A securing member is provided for securing the injector to the mounting member. The extension member of the end cap extends through the mounting member and through the securing member to the end of the extension member located outside of and spaced from the exhaust conduit.

Certain exemplary embodiments are methods associated with cooling a nozzle of diesel exhaust fluid delivery system that includes a storage tank for storing a source of diesel exhaust fluid and a doser operable to receive the diesel exhaust fluid from the storage tank and pump a measured quantity of the diesel exhaust fluid through the nozzle into an exhaust system of an internal combustion engine. Certain exemplary methods include determining a temperature of the nozzle in the diesel exhaust fluid delivery system; when the temperature of an exhaust fluid exceeds a predetermined threshold temperature, initiating a nozzle cooling cycle of operation of the doser in which the diesel exhaust fluid from the storage tank is injected through the nozzle in one or more pulses to cool the nozzle with the diesel exhaust fluid; terminating the nozzle cooling cycle of operation of the doser when the temperature of the nozzle is less than the predetermined threshold temperature; delaying pumping of diesel exhaust fluid from the storage tank with the doser for a predetermined time period after terminating the nozzle cooling cycle of operation; and after the predetermined time period elapses, initiating an emissions reduction cycle of operation of the doser in which diesel exhaust fluid from the storage tank is pumped by the doser through the nozzle in an amount determined to reduce emissions from the exhaust gas.

In some embodiments, the nozzle cooling cycle of operation of the doser includes injecting diesel exhaust fluid in two or more sequential pulses each separated by a delay period. In other embodiments, determining the temperature of the nozzle includes determining a temperature of exhaust gas in the exhaust system. In still other embodiments, the one or more pulses of diesel exhaust fluid during the nozzle cooling cycle of operation of the doser correspond to a diesel exhaust fluid amount that is substantially vaporized during the nozzle cooling cycle of operation. In yet other embodiments, the amount of diesel exhaust fluid to reduce emissions is supplied by a continuous injection of diesel exhaust fluid during the emissions reduction cycle of operation of the doser. In certain embodiments, the diesel exhaust fluid is a urea solution and the exhaust system includes a selective catalytic reduction catalyst downstream of the nozzle.

In other embodiments, the method includes insulating the nozzle and a length of a conduit extending from the nozzle toward the doser with an air gap formed by an insulation jacket around the nozzle and the length of conduit. In certain refinements, the jacket includes an elongated side wall defining a hollow interior extending between a first end and an opposite second end of the jacket. The conduit passes through an end wall at the first end of the jacket and the nozzle is located in the side wall of the jacket.

Certain exemplary methods include cooling a nozzle that is directly connected to an exhaust system that receives exhaust gas from an engine by completing a nozzle cooling cycle of operation of a diesel exhaust fluid delivery system that provides diesel exhaust fluid to the nozzle for injection into the exhaust system. Completing the nozzle cooling cycle includes injecting one or more pulses of diesel exhaust fluid through the nozzle in a first amount that substantially phase transforms the diesel exhaust fluid to cool the nozzle to less than a threshold temperature prior to initiating an emissions reduction cycle of operation in which diesel exhaust fluid is injected through the nozzle in a second amount that is greater than the first amount to reduce emissions in the exhaust gas.

In some embodiments, the method includes terminating the nozzle cooling cycle of operation of the doser when the temperature of the nozzle is less than the predetermined threshold. In one refinement, the method further includes delaying the emissions reduction cycle of operation for a predetermined time period while injecting air through the nozzle.

In another embodiment, the nozzle cooling cycle includes generating two or more pulses of diesel exhaust fluid each separated by a delay period. In yet another embodiment, the emissions reduction dosing amount is supplied by a continuous injection of diesel exhaust fluid during the emissions reduction cycle of operation of the doser. In still other embodiments of the method, the diesel exhaust fluid delivery system includes a storage tank for storing diesel exhaust fluid and the doser is operable to receive diesel exhaust fluid from the storage tank and pump the diesel exhaust fluid through the nozzle. In certain embodiments, the diesel exhaust fluid is a urea solution and the exhaust system includes a selective catalytic reduction catalyst downstream of the nozzle.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
   a reductant delivery system that includes a storage tank for storing reductant for treatment of exhaust gas produced by operation of an internal combustion engine, the delivery system further including a doser operable to pump the reductant from the storage tank through a conduit extending from the doser to an injector in fluid communication with an exhaust system, wherein the injector includes:
   a nozzle connected to and in fluid communication with the conduit and the exhaust system;
   an elongated jacket including a side wall defining a hollow interior extending between a first end and an opposite second end of the jacket; and
   at least a portion of the conduit extending through the first end to the nozzle mounted to the side wall, the hollow interior forming an air insulation gap around the conduit from the nozzle to the first end of the jacket.

2. The system of claim 1, wherein the conduit includes a first portion extending through the first end, a second portion extending from the nozzle into the hollow interior, and a bend extending between and connecting the first portion and the second portion to one another in a substantially orthogonal relationship.

3. The system of claim 1, wherein the injector further includes an end cap at the first end of the jacket and the only direct connection of the conduit with the injector is at the end cap outside of the exhaust gas carried by the exhaust system.

4. The system of claim 3, wherein the end cap includes a flange portion connected to the side wall and a boss portion extending oppositely from the flange portion that defines a through-hole for receiving the conduit therethrough.

5. The system of claim 1, wherein the nozzle includes a body with an inner portion extending into the jacket that defines a cylindrically shaped interior receptacle configured to receive an end of the conduit therein and at least two flow paths through the body that are in fluid communication with an interior of the conduit.

6. The system of claim 5, wherein the body of the nozzle further includes an outer portion that extends outwardly from and defines a lip around the inner portion, the inner portion projecting outwardly from the side wall of the jacket so that the inner portion and the outer portion of the nozzle are connected to an exhaust conduit of the exhaust system.

7. The system of claim 1, wherein the injector includes an end cap at the first end of the jacket, the end cap including an extension member extending from the jacket that defines an extension of the air gap and the only direct connection of the conduit with the injector is at an end of the extension member that is opposite the first end of the jacket.

8. The system of claim 7, wherein the end cap includes a flange portion connected to the side wall of the jacket, the extension member extending from flange portion to the end of the extension member, the end cap further including a boss portion extending outwardly from the end of the extension member that defines a through-hole for receiving the conduit therethrough.

9. The system of claim 7, wherein the injector is mounted to an exhaust conduit of the exhaust system so that the extension member extends radially outwardly from the exhaust conduit to the end of the extension member.

10. The system of claim 9, further comprising:
    a mounting member connected to the exhaust conduit for supporting end cap on the exhaust conduit with the jacket projecting from the end cap into the exhaust conduit; and
    a securing member for securing the injector to the mounting member, wherein the extension member of the end cap extends through the mounting member and the securing member to the end of the extension member.

* * * * *